(No Model.)

E. THOMSON.
METHOD OF CONTROLLING ALTERNATING CURRENT INDUCTION.

No. 465,078. Patented Dec. 15, 1891.

ATTEST:
J. H. Hurdle
Jno. H. Capel

INVENTOR:
Elihu Thomson

By H. C. Townsend
Attorney

---

UNITED STATES PATENT OFFICE.

ELIHU THOMSON, OF LYNN, MASSACHUSETTS.

METHOD OF CONTROLLING ALTERNATING-CURRENT INDUCTION.

SPECIFICATION forming part of Letters Patent No. 465,078, dated December 15, 1891.

Application filed April 17, 1889. Serial No. 307,615. (No model.)

*To all whom it may concern:*

Be it known that I, ELIHU THOMSON, a citizen of the United States, and a resident of Lynn, in the county of Essex and State of Massachusetts, have invented a certain new and useful Method of Controlling Alternating-Current Induction and Self-Induction, of which the following is a specification.

My present invention relates to a method of controlling or varying the flow of current in an alternating-current circuit.

The invention consists, essentially, in organizing circuits or coils in the circuit in which the currents are to be governed and upon a substantially closed core, and in moving one or both circuits or coils from a position of coincidence of axis on the core to a position more or less near one at which the axes are at right angles, while the magnetic circuit of the core remains comparatively still closed. For example, I establish an iron core upon which one of the coils is wound, while a portion of the core carrying the other coil is capable of a rotary movement on a suitable support, whereby the plane of said coil or the magnetic axis therefor may be shifted or changed in its angular relation to the general magnetic axis. When the coils are given a substantial coincidence of magnetic axes, or when the iron in their centers are connected magnetically as a closed core, the coils will be reversely wound, so as to neutralize one another's effects in magnetizing the core. From this position the movable coil may be thrown so that its axis is not coincident magnetically with the axis of the other coil, and its position may even be reversed by continuing the movement, so that it co-operates with the other coil in magnetizing the core. In this case there will be a progressive increase of self-induction and decrease of current in the circuit to be governed in passing from one position to the other.

Figure 1:
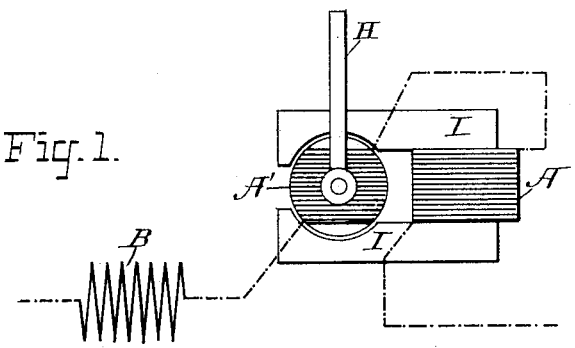
Figure 2:
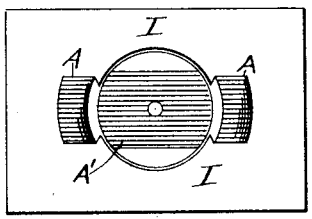
Figure 3:
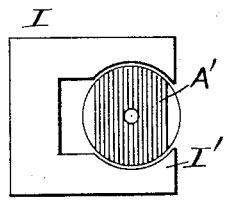

In the accompanying drawings, Figure 1 illustrates my invention diagrammatically and shows one of the forms of apparatus that may be used in practicing the invention. Fig. 2 illustrates another form of apparatus that may be used. Fig. 3 shows the movable portion of the apparatus, Fig. 1, in a different position.

I is a laminated or otherwise divided iron core constructed of a portion passing through the axis of a coil A, and portions extending to and surrounding a movable iron piece bearing a coil A' wound in a manner similar to the old Siemens armature, the movable iron piece itself being, as shown, a Siemens armature mounted to turn on an axis between pole-pieces made of the opposed portions of the core I I, a very slight clearance being given between the two. A handle H, fastened to the shaft which bears the movable portion of the core with its coil A', permits the rotation of the coil A' from the position shown where there is substantial coincidence of its magnetic axis with the magnetic axis of the iron passing through both coils as a closed magnetic circuit to a position such as shown in Fig. 3, where the plane of the coil is now in line with the magnetic axis of the coil I, or, in other words, the axis of the coil is not coincident with the axis of the remaining portion of the coil. The coils A A' thus inductively related are wound and placed in the same circuit in series with one another for the purpose of controlling the flow of currents in such circuit by the impedence or self-induction generated in the device and regulated by varying the angle of the magnetic axis of one coil or the other to the general magnetic circuit. In the present case they are shown as arranged to regulate the flow of currents in a coil, such as B, which may represent any portion of an alternating-current circuit containing devices the flow of current in which is to be regulated.

While I have shown the coil A' as the one on the movable portion and the coil A as that on the fast portion of the core, it will be understood that both portions might of course be movable relatively one to the other. When the magnetizing action of the coil A' is opposed to that of A in its action on the core, which is common to both, the self-induction is at a minimum, and the two coils act practically by their resistance only because neither can generate a magnetic field in the body of the core. If, however, the coils have their positions changed so as to bring their magnetizing actions or axes at right angles a certain amount of self-induction will be generated, which will go on increasing as the coils are moved until the coil A', having turned one hundred and eighty degrees, with respect to A, it will now add its magnetizing effect on the core in the same direction as that of coil A. At this moment the self-induction in both coils, or in the circuit in which they are placed, will be at its maximum and a great hinderance or impeding action will thereby be generated which opposes the passage of current. It will thus be seen that a very wide range of adjustment is practicable with the arrangement. It will be obvious that the same substantial actions might be brought about by the use of other structures with as great or greater effectiveness. Thus, for instance, the coils might be disposed with relation to one another in the manner indicated in Fig. 2. In this case the movable portion is mounted in the center of an iron frame I I, cut away for the insertion of stationary coils A, which surround and inclose a movable armature, so that the coil A' upon the armature itself may be put into parallelism with the coil A outside of it, or may be thrown into position of parallelism with the coil A outside of it, or may be thrown into position more or less at an angle therewith up to a right angle, or farther. The only difference between this structure and the former ones is that the actions of the coils are more intimate and improved, due to their substantially occupying the same position relatively to the iron masses.

In the construction, Fig. 2, it will be observed that, as before, there is a closed magnetic circuit of iron threading both coils, the magnetic axis of said iron circuit passing through the iron of the coil A', and being coincident with the magnetic axis of such coil when the latter is in the position shown in the figure. When the coil is turned, the angular relation of its magnetic axis to the general axis is varied, with the effects before described.

What I claim as my invention is—

1. The herein-described method of controlling the flow of current in an alternating-current circuit, consisting in varying the angle of the magnetic axis of two coils placed in said circuit and in inductive relation to a substantially-closed magnetic circuit of iron.

2. The herein-described method of adjusting the flow of current in an alternating-current circuit, consisting in breaking or interrupting to a greater or less extent the coincidence of the magnetic axis of a coil in the circuit of the alternating current with the general magnetic axis of an iron magnetic circuit threading a second coil in circuit with the first, as and for the purpose described.

3. The method of controlling the strength or induction or self-induction in an electric circuit or circuits, consisting in moving a portion of core on which a coil is wound from a position of substantial magnetic coincidence of axis with that of another coil which is in circuit with the first to a position of inversion of magnetic axial relation.

Signed at Lynn, in the county of Essex and State of Massachusetts, this 1st day of April, A. D. 1889.

ELIHU THOMSON.

Witnesses:
J. W. GIBBONEY,
J. B. JOHNSON.